(12) United States Patent
Kim et al.

(10) Patent No.: US 7,991,194 B2
(45) Date of Patent: Aug. 2, 2011

(54) APPARATUS AND METHOD FOR RECOGNIZING POSITION USING CAMERA

(75) Inventors: Jae-Ho Kim, Daejon (KR); Gyung-Chul Shin, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 908 days.

(21) Appl. No.: 11/950,641

(22) Filed: Dec. 5, 2007

(65) Prior Publication Data

US 2008/0137912 A1    Jun. 12, 2008

(30) Foreign Application Priority Data

Dec. 8, 2006  (KR) .................. 10-2006-0125150

(51) Int. Cl.
*G06K 9/00* (2006.01)
(52) U.S. Cl. ...................................... 382/103; 348/135
(58) Field of Classification Search .................. 382/100, 382/103, 104, 106; 348/94, 135, 169
See application file for complete search history.

(56) References Cited

U.S. PATENT DOCUMENTS

| | | | | |
|---|---|---|---|---|
| 5,414,474 | A * | 5/1995 | Kamada et al. | 348/700 |
| 6,470,264 | B2 * | 10/2002 | Bide | 701/207 |
| 6,924,741 | B2 * | 8/2005 | Tamayama et al. | 340/572.1 |
| 7,613,361 | B2 * | 11/2009 | Anabuki et al. | 382/287 |
| 7,657,065 | B2 * | 2/2010 | Kotake et al. | 382/106 |
| 2002/0031242 | A1 * | 3/2002 | Yasui et al. | 382/104 |

FOREIGN PATENT DOCUMENTS

| | | |
|---|---|---|
| KR | 1020030041659 | 5/2003 |
| KR | 1020060072900 | 6/2006 |
| KR | 1020060081068 | 7/2006 |

OTHER PUBLICATIONS

Office Action for Korean App. 10-2006-0125150.
Notice of Allowance dated Jun. 25, 2009, for Korean application No. 10-2006-0125150.

* cited by examiner

*Primary Examiner* — Anand Bhatnagar
(74) *Attorney, Agent, or Firm* — Lowe Hauptman Ham & Berner LLP

(57) ABSTRACT

Provided are a location awareness apparatus using a camera and a method thereof. The apparatus includes: an image capturing unit for photographing a position identification tag using a camera; a distance measuring unit for measuring a distance to a position identification tag; an incident angle measuring unit for measuring a photographing angle at a visual point; an image analyzing unit for reading the photographed image from the image capturing unit, and requesting location information corresponding to the read information to a position recognition server; and a location awareness unit for estimating a current location using the distance to the position identification tag, the photographing angle of the position identification tag, and the location information corresponding to the read information by the image analyzing unit.

13 Claims, 7 Drawing Sheets

APPARATUS AND METHOD FOR RECOGNIZING POSITION USING CAMERA

CROSS-REFERENCE TO RELATED APPLICATIONS

The present invention claims priority of Korean Patent Application No. 10-2006-0125150, filed on Dec. 8, 2006, which is incorporated herein by reference.

BACKGROUND OF THE INVENTION

1. Field of the Invention

The present invention relates to a location awareness apparatus and method for recognizing a position using a camera; and, more particularly, to a location awareness apparatus and method for recognizing a position of a portable terminal such as a mobile phone and a personal digital assistant (PDA) using a camera and an electric compass, which are externally or internally mounted at the terminal in a predetermined space with a position identification tag disposed.

This work was supported by the IT R&D program for MIC/IITA [2006-S-003-01, "Research on service platform for the next generation mobile comm."].

2. Description of Related Art

Location awareness Methods are classified into a network based location awareness method and a hand-set based location awareness method.

The network based location awareness method measures a time difference of signals from a plurality of mobile communication base stations and calculates a location of a cellular phone user based on the measured time difference at a predetermined server.

The hand-set based location awareness method calculates the position of a hand-set based on global positioning system (GPS) signals from a plurality of satellites, network signals, or the combination of the two signals.

GPS or mobile communication network based local awareness systems were designed for an outdoor environment. Accordingly, the GPS or mobile communication network based local awareness systems could not recognize a position of a user in an indoor place, an underground place, and a shadow area of a building due to the low precision of a signal, signal attenuation, and multipath problem.

Lately, local awareness systems using an infrared ray, an ultrasonic wave, and a radio frequency were introduced for detecting a position of a user in an indoor place. However, such local awareness systems need additional devices for receiving and transmitting the infrared ray, the ultrasonic wave, and the radio frequency, which are disposed at predetermined locations in the indoor place. Also, a corresponding portable terminal must have the equivalent functions of the additional devices. Therefore, such local awareness systems have a disadvantage of a high cost.

SUMMARY OF THE INVENTION

An embodiment of the present invention is directed to providing a local awareness apparatus and method for recognizing the location of a user having a portable terminal in a predetermined space with position identification tags disposed using a camera and an electric compass, which are internally or externally mounted at the portable terminal such as a mobile phone, personal digital assistant (PDA), or notebook computer.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a location awareness apparatus for recognizing a position using a camera, including: an image capturing unit for photographing a position identification tag using a camera; a distance measuring unit for measuring a distance to a position identification tag; an incident angle measuring unit for measuring a photographing angle at a visual point of photographing a position identification tag by the image capturing unit; an image analyzing unit for reading the photographed image from the image capturing unit, and requesting location information corresponding to the read information to a position recognition server; and a location awareness unit for estimating a current location using the distance to the position identification tag, which is measured by the distance measuring unit, the photographing angle of the position identification tag, which is measured by the incident angle measuring unit, and the location information corresponding to the read information by the image analyzing unit.

In accordance with another aspect of the present invention, there is provided a location awareness apparatus for recognizing a position, including: a user portable terminal; and a local awareness server. The user portable terminal includes: an image capturing unit for photographing a position identification tag using a camera; a distance measuring unit for measuring a distance to a position identification tag; an incident angle measuring unit for measuring a photographing angle at a visual point of photographing a position identification tag by the photographing unit; and a transmitting unit for transferring the photographed image by the photographing unit, the measured distance information by the distance measuring unit, and the incident angle information measured by the incident angle measuring unit. The position recognition server includes: an image analyzing unit for reading the photographed image transferred from the transmitting unit and requesting location information corresponding to the read information to a database; a location awareness unit for estimating a current location using the distance to the position identification tag, which is transmitted from the transmitting unit, the photographing angle of the position identification tag, which is transmitted from the transmitting unit, and the location information corresponding to the read information by the image analyzing unit; and a transmitting unit for transmitting the estimated current location information to the user portable terminal.

In accordance with still another aspect of the present invention, there is provided a location awareness method using a camera, including the steps of: measuring a distance to a position identification tag photographed by a camera; measuring a photographing angle at a visual point of photographing the position identification tag; reading the photographed image and requesting location information corresponding the read information; and calculating a current location using information about the measured distance, the measured photographing angle, and the location information corresponding to the read information.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
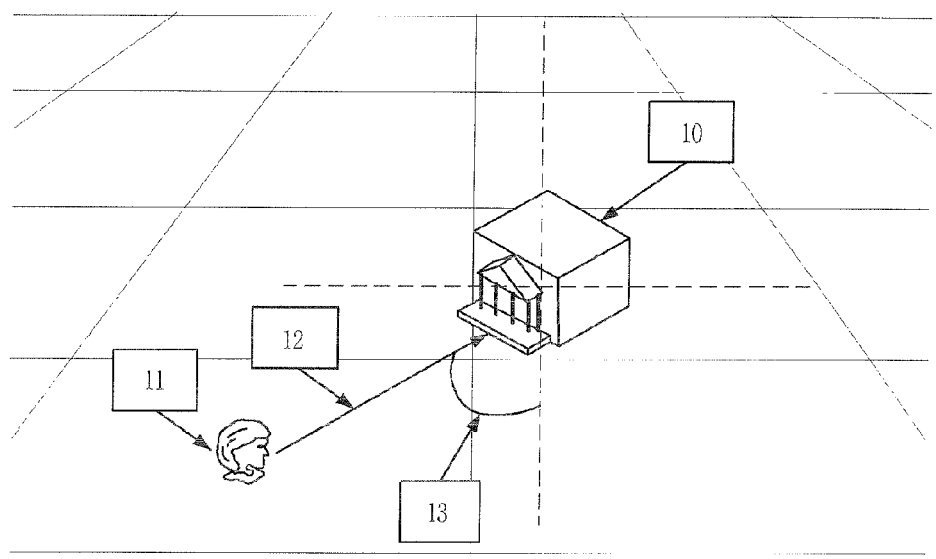
FIG. 1 is a diagram illustrating a method for recognizing a location of a user based on a visual sense of a user.

FIG. 1 is a diagram illustrating a method for recognizing a location of a user based on a visual sense of a user.

Referring to FIG. 1, a user 11 visually recognizes a reference object 10 such as a building and a road, which are memorized in a user's brain through learning or experience. Here, the user 11 may estimate a distance 12 to the reference object 10 using a perspective and a direction to the reference object along the direction 12 to the user's sight. Finally, the user 11 recognizes the location of the reference object and a distance and a direction to a corresponding object based on the recognized location of the reference object. Particularly, the user 11 may more accurately recognize the location of a target object as the number of reference objects increases.

A local awareness system using a camera, which is equivalent to the eyes of a user 11 of FIG. 1, will be described with reference to FIG. 2.

Figure 2:
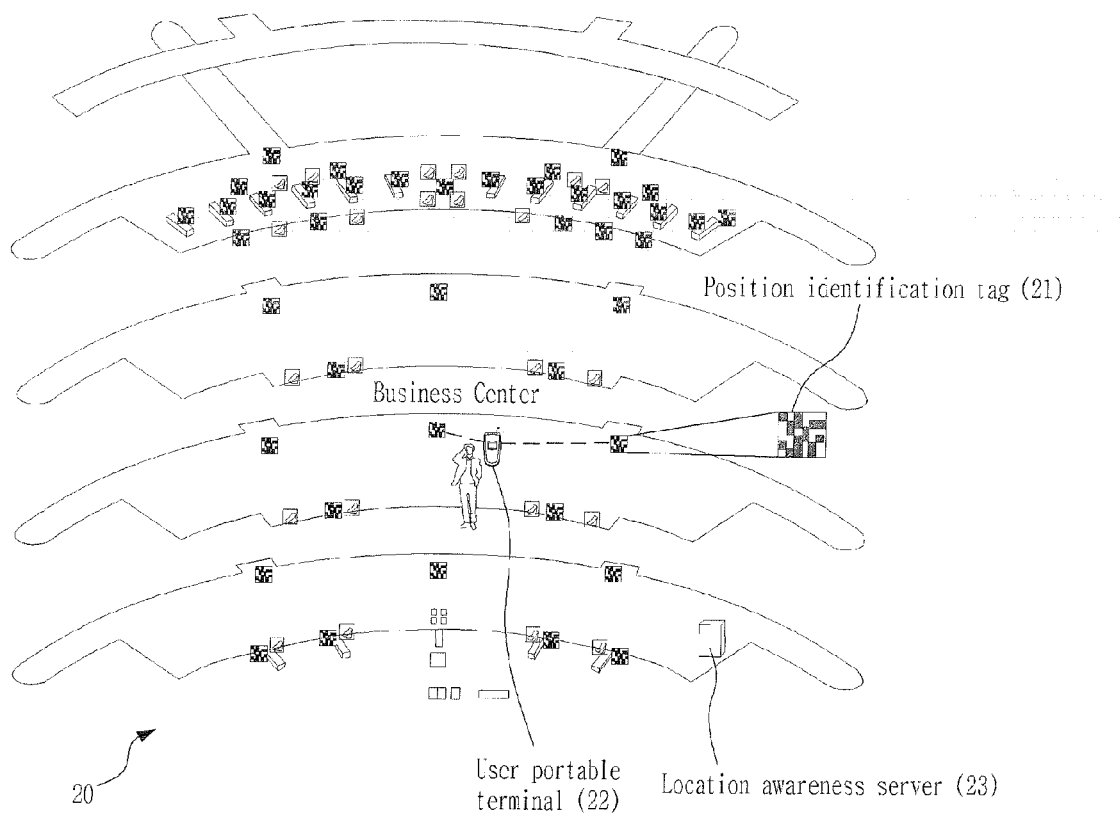
FIG. 2 is a diagram illustrating a local awareness system using a camera in accordance with an embodiment of the present invention.

FIG. 2 is a diagram illustrating a local awareness system using a camera in accordance with an embodiment of the present invention.

Referring to FIG. 2, the local awareness system using the camera according to the present embodiment includes position identification tags 21, a user portable terminal 22, and a local awareness server 23.

Each of the position identification tags 21 includes location coordinate data or position identification information, which can be mapped to a corresponding coordinate and is printed as unique two dimensional barcode. The position identification tags 21 are disposed at predetermined locations in a corresponding space at a predetermined density.

The user portable terminal 22 includes an image capturing unit 221, a distance measuring unit 222, an incident angle measuring unit 223, an image analyzing unit 224, a local awareness unit 225, and a display unit 226.

The image capturing unit 221 captures the position identification tags 21 disposed at a predetermined space through a camera that may be internally or externally mounted at the user portable terminal 22.

The distance measuring unit 222 calculates a distance to the captured position identification tag 21 based on a camera focus distance of the image capturing unit 221. The distance measuring unit 222 may includes an additional distance measuring module such as an ultrasound sensor or an infrared ray sensor for further accurately measuring a distance.

The incident angle measuring unit 223 measures a photographing angle at a visual point of photographing the position identification tag 21 using an electric compass that is internally or externally mounted at the user portable terminal 22.

The image analyzing unit 224 reads a location coordinate data or a position identifier such as 2-D barcode from the captured image of the captured position identification tag, requests information about the read location coordinate data or position identifier and map information of a predetermined area to a location awareness server 23, and receives the requested information about location coordinate data or position identifier and the map information from the location awareness server 23. Also, the image analyzing unit 224 transfers the information about a corresponding position identification tag 21 and the map information of a predetermined area from the location awareness server 23, information about a distance to a corresponding position identification tag 21 from the distance measuring unit 222, and information about the photographing angle measured at the incident angle measuring unit 223 to the location awareness unit 225.

The location awareness unit 225 calculates a current location based on the location information of the reference position identification tag from the image capturing unit 224, the direction information which is the photographing angle information from the incident angle measuring unit 223, the distance information which is the distance to the corresponding position identification tag 21 measured by the distance measuring unit 22. The location awareness unit 225 can calculate the current location using a triangulation if the image capturing unit 221 captures a plurality of position identification tags at the same area. Also, the location awareness unit 225 can display predetermined map information transferred from the image analyzing unit 224 with the calculated location information through the display unit 226.

According to the performance and the application of a user portable terminal 22, a module requiring complicated processing such as image analysis and location awareness may be included in a location awareness server 23, and the location awareness server 23 transfers the result of location awareness to the user portable terminal 22 through networking. Such an embodiment will be described with reference to FIG. 5.

The display unit 226 displays information obtained from the image capturing unit 221, the distance measuring unit 222, and the incident angle measuring unit 223 through a screen and also displays a current location calculated by the location awareness unit 225.

The location awareness server 23 includes a location information database 231.

The location information database 231 stores the map information of a predetermined area, and information about position identification tags 21 disposed at a predetermined area, which is information about location coordinate data or position identifier such as a 2-D barcode printed on the position identification tag 21 and the location of each position identification tag 21 on a map of a predetermined space.

Figure 3:
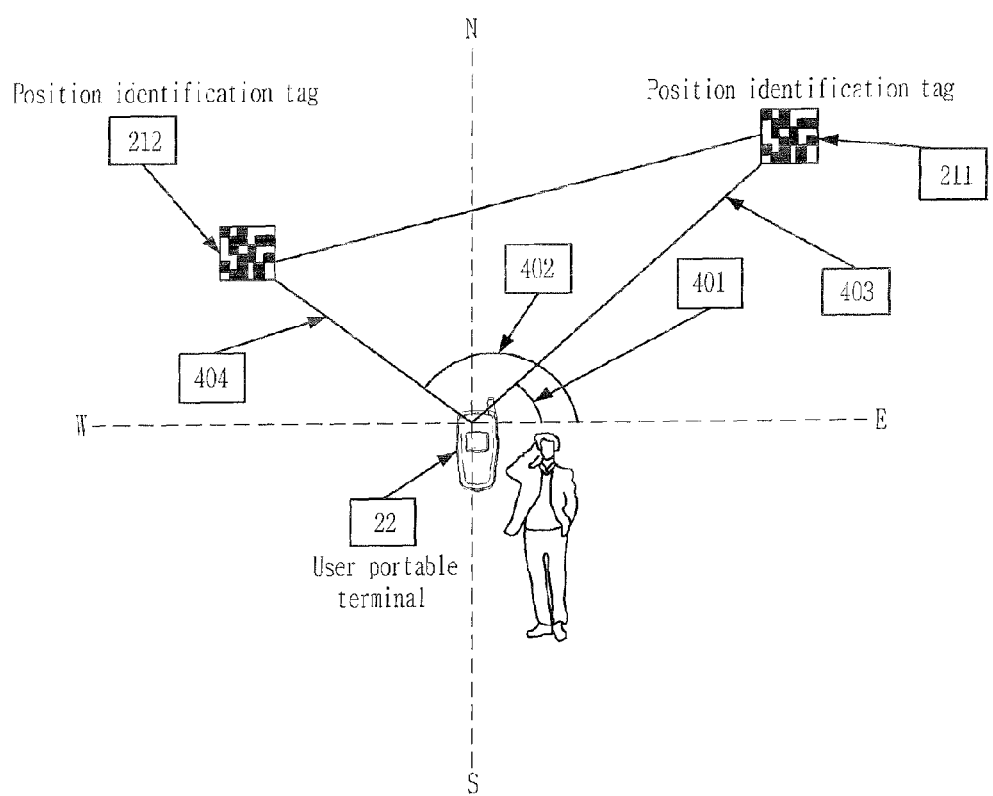
FIG. 3 is a diagram illustrating an arrangement of position identification tags in an air port as an example.

FIG. 3 is a diagram illustrating an arrangement of position identification tags in an air port as an example.

Referring to FIG. 3, the position identification tags 21 are disposed at a predetermined physical place or an object, for example, the inside of an airport 20. Here, the position identification tags 21 are disposed at predetermined locations at predetermined density according to the accuracy of local awareness and the accessibility of a user.

Figure 4:
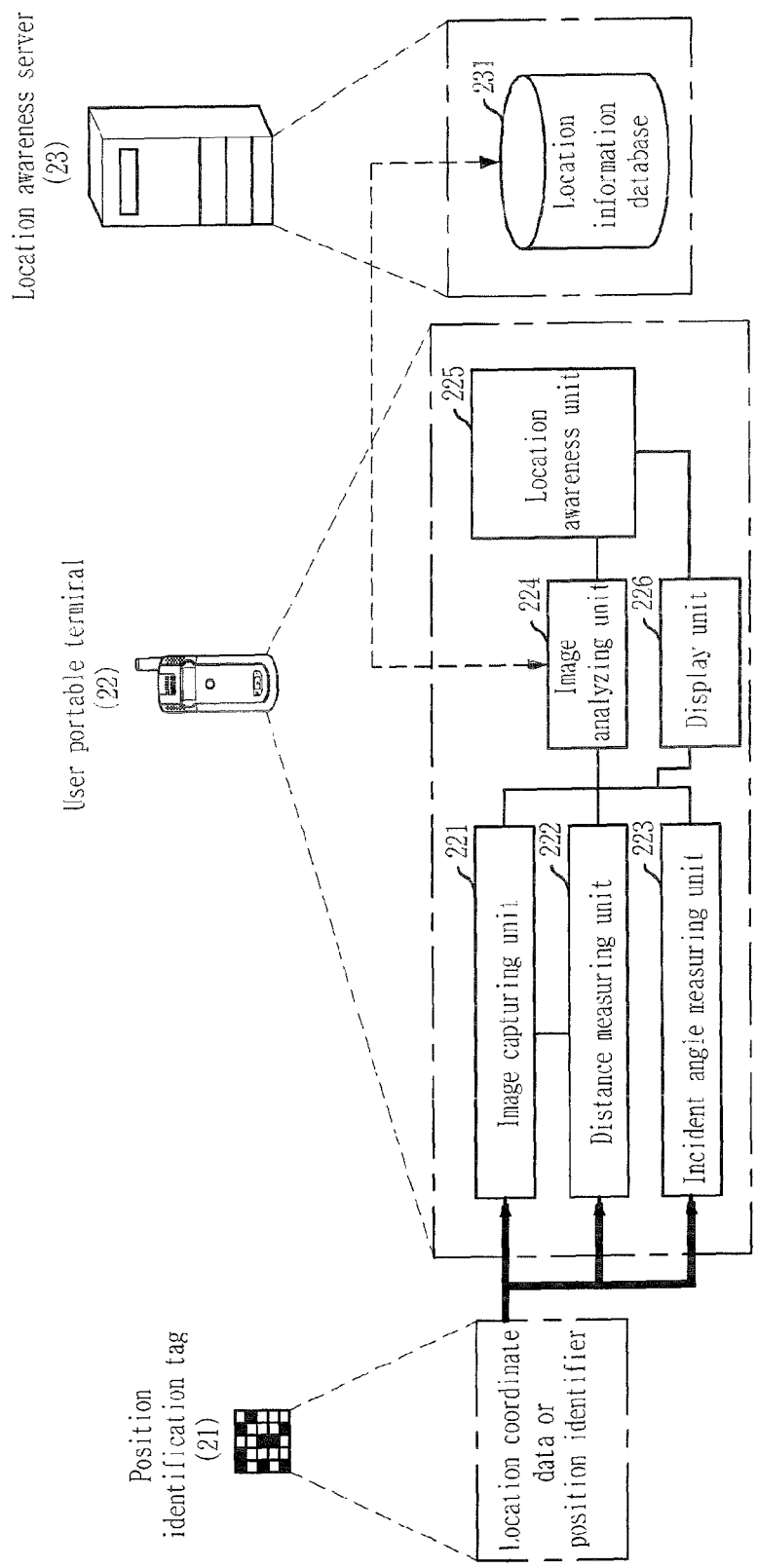
FIG. 4 is a diagram illustrating a local awareness method using a camera in accordance with an embodiment of the present invention.

FIG. 4 is a diagram illustrating a local awareness method using a camera in accordance with an embodiment of the present invention.

In FIG. 4, the local awareness method according to the present embodiment is described as that a location of a user portable terminal 22 is recognized using two position identification tags 211 and 212 are used. However, the local awareness method according to the present embodiment may use more than two position identification tags to recognize the location of the user portable terminal 22.

At first, the user portable terminal 22 having a camera that may internally or externally included therein photographs the position identification tags 211 and 212.

Then, the user portable terminal 22 measures a distance to the photographed position identification tags 211 and 212 based on a focus distance of the camera and measures the incident angles of the photographed position identification tags 211 and 212 using an electric compass that internally or externally mounted in the user portable terminal 22.

The user portable terminal 22 reads location coordinate data or position identifiers from the images of the position identification tags 211 and 212 and requests information related to the read location coordinate data or position identifier from the location awareness server 23.

The location awareness server 23 searches the requested information related to the location coordinate data or position identifier from the location information database 231 and transfers the searched information to the user portable terminal 22.

Then, the user portable terminal 22 calculates a current location using triangulation based on the measured incident angles 401 and 402, the measured distances 403 to 404 to the position identification tags 211 and 212, and information about the position identification tags 211 and 212 which is transferred from the location awareness server 23.

The accuracy of location awareness may increase as the user portable terminal 22 photographs more images of the position identification tags.

Figure 5:
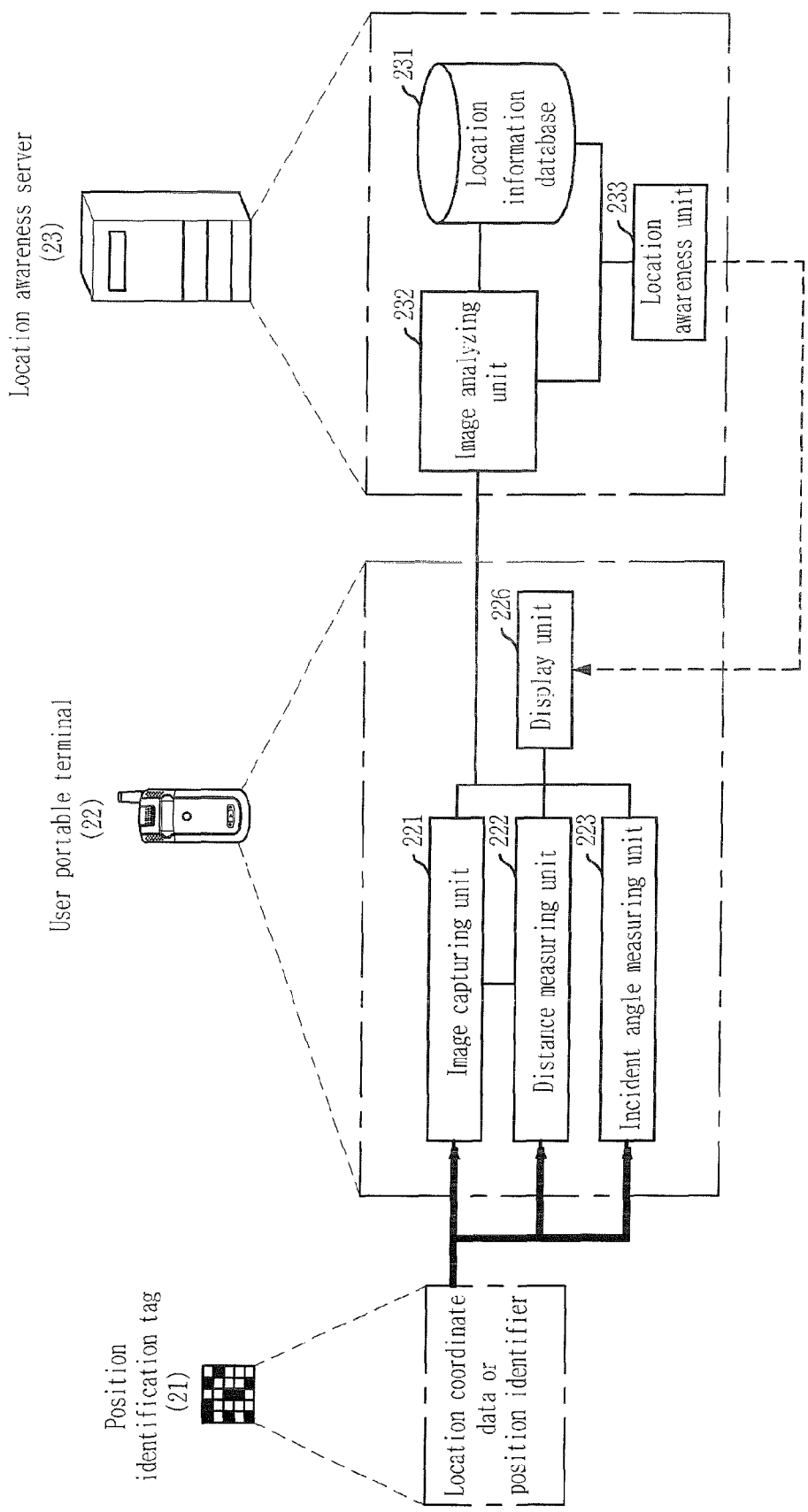
FIG. 5 is a diagram illustrating a local awareness system using a camera in accordance with another embodiment of the present invention.

FIG. 5 is a diagram illustrating a local awareness system using a camera in accordance with another embodiment of the present invention.

Referring to FIG. 5, the local awareness system using the camera according to another embodiment includes position identification tag 21, a user portable terminal 22, and a location awareness server 23. The position identification tag 21 includes location coordinate data or position identification information, which can be mapped to a corresponding coordinate, which is printed thereon as a unique two dimensional barcode. The position identification tags 21 are disposed at proper locations in a space at a predetermined density.

The user portable terminal 22 includes an image capturing unit 221, a distance measuring unit 222, an incident angle measuring unit 223, and a display unit 226.

The image capturing unit 221 captures the position identification tags 21 disposed at a predetermined space through a camera that may be internally or externally mounted at the user portable terminal 22. Also, the image capturing unit 221 transfers the captured images of the position identification tags 21 to the location awareness server 23.

The distance measuring unit 222 calculates a distance to the captured position identification tag 21 based on a camera focus distance of the image capturing unit 221. The distance measuring unit 222 may includes an additional distance measuring module such as an ultrasound sensor or an infrared ray sensor for further accurately measuring a distance. Also, the distance measuring unit 222 transfers the measured distance information to the location awareness server 23.

The incident angle measuring unit 223 measures a photographing angle at a visual point of photographing the position identification tag 21 using an electric compass that is internally or externally mounted at the user portable terminal 22. Also, the incident angle measuring unit 233 transfers the incident angle information to the location awareness server 23.

The display unit 226 displays the information obtained at the image capturing unit 221, the distance measuring unit 222, and the incident angle measuring unit 223 through a screen. The display unit 226 also displays information about a current location transferred from the location awareness server 23.

The location awareness server 23 includes a location information database 231, an image analyzing unit 232, and a location awareness unit 233.

The location information database 231 stores the map information of a predetermined area and information about position identification tags 21 disposed at a predetermined area, which is information about location coordinate data or position identifier such as a 2-D barcode printed on the position identification tag 21 and the location (coordinate) of each position identification tag 21 on a map of a predetermined space.

The image analyzing unit 232 reads a location coordinate data or a position identifier such as 2-D barcode from the captured image of the captured position identification tag transferred from the user portable terminal 22, searches information about the read location coordinate data or position identifier and map information of a predetermined area from the location information database 231, and obtains the information about a corresponding position identification tag 21. Also, the image analyzing unit 232 transfers the information about the measured distance to the position identification tag 21, the information about the incident angle of the position identification tag 21, and the information about the position identification tag 21, which are transferred from the user potable terminal 22, to the location awareness unit 233.

The location awareness unit 233 calculates a current location based on the distance information, the incident angle information, and the position identification tag information from the image analyzing unit 232. Here, the location awareness unit 233 can calculate the current location using a triangulation if the location awareness unit 233 receives information about a plurality of position identification tags 21 from the image analyzing unit 232. Also, the location awareness unit 233 transmits the calculated current position information with predetermined map information stored in the location information database 231 to the user portable terminal 22.

Figure 6:
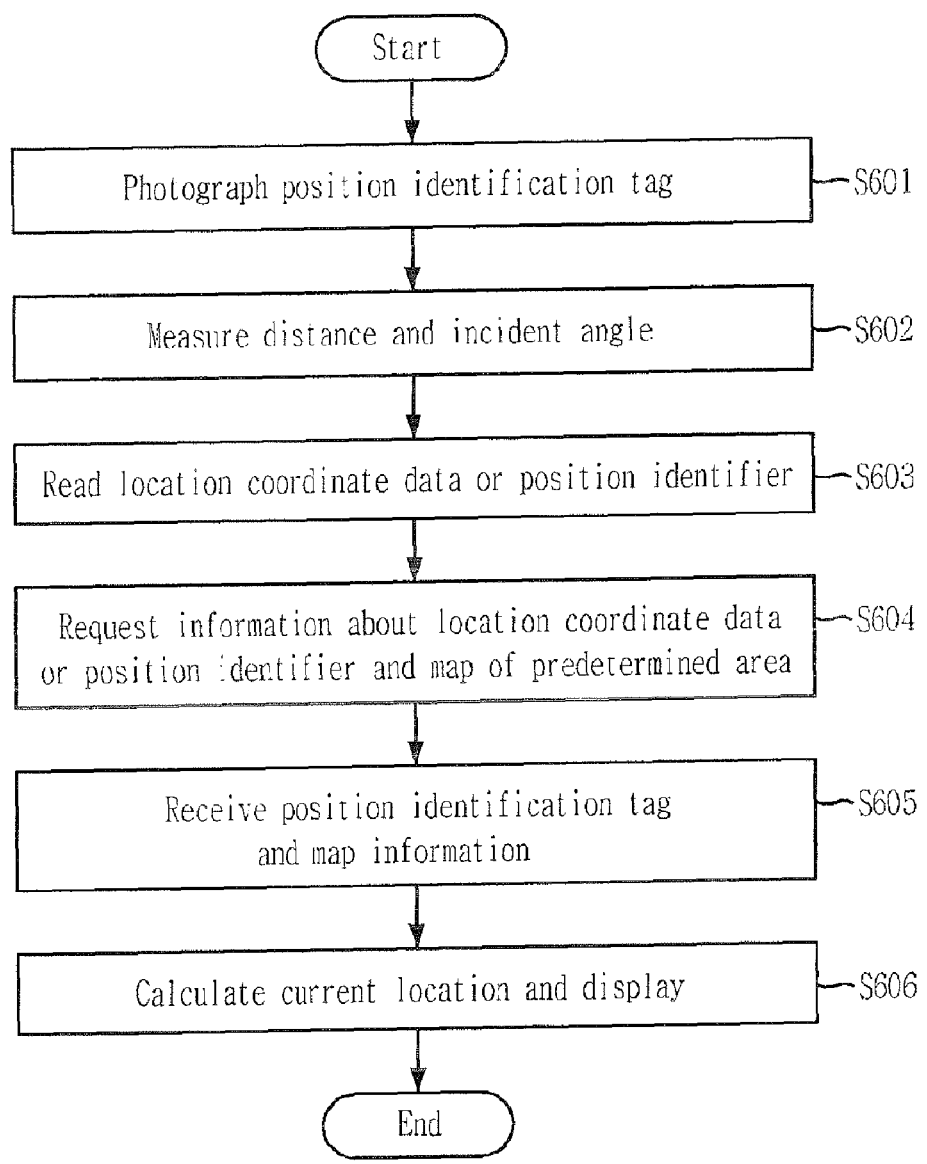
FIG. 6 is a flowchart illustrating a location awareness method for a location awareness system shown in FIG. 4.

FIG. 6 is a flowchart illustrating a location awareness method for a location awareness system shown in FIG. 4.

At first, the user portable terminal 22 photographs the position identification tags 21 at step S601.

At step S602, the user portable terminal 22 measures a distance to the position identification tag 21 based on a focus distance of a camera that is internally or externally mounted at the user portable terminal 22 and measures an incident angle of the position identification tag 21.

At step S603, the user portable terminal 22 reads location coordinate data or position identifier from the photographed image of the position identification tag 21. The user portable terminal 22 requests information about the read location coordinate data or position identifier and a map of a predetermined area to the location awareness server 23 at step 604.

Then, the user portable terminal 22 receives the requested information about the read location coordinate data or position identifier and a map of a predetermined area from the location awareness server 23 at step S605.

At step S606, the user portable terminal 22 calculates a current position based on the position identification tag information from the step S605, the distance information, and the photographing angle information which is the incident angle information obtained from the step S602, and displays the calculated current position on a screen.

Figure 7:
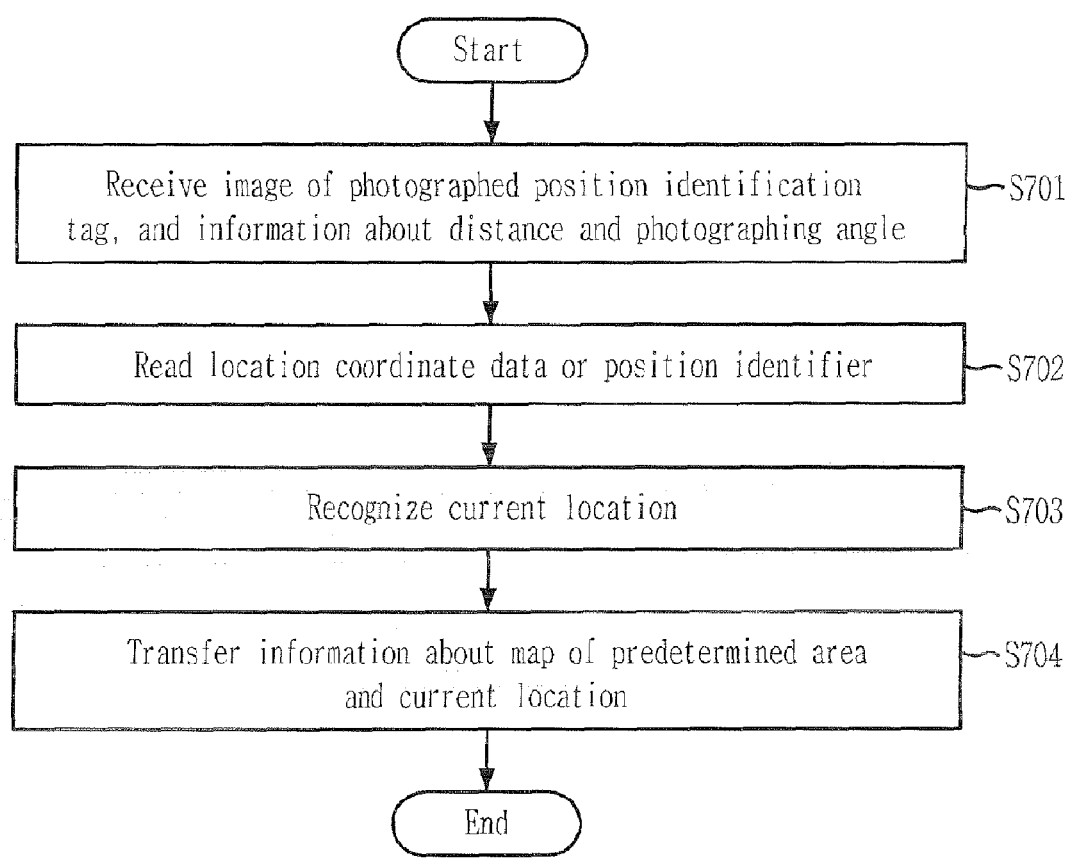
FIG. 7 is a flowchart illustrating a location awareness method for a location awareness system shown in FIG. 5.

FIG. 7 is a flowchart illustrating a location awareness method for a location awareness system shown in FIG. 5.

At first, the location awareness server 23 receives the image of photographed position identification tag 21, a measured distance to the position identification tag 21, and an incident angle of the position identification tag 21 from the user portable terminal 22 at step S701.

The location awareness server 23 reads location coordinate data or position identifier from the received image of the position identification tag 21 and obtains information about the corresponding position identification tag 21 at step S702.

At step S703, the location awareness server 23 calculates a current location based on the received information about the measured distance and incident angle to the position identification tag 21 and the obtained information about the corresponding position identification tag.

At step S704, the location awareness server 23 transfers the calculated current location information with information about a map of a predetermined area stored in the location information database 231 to the user portable terminal 22.

A camera based location awareness apparatus according to an embodiment of the present invention can recognize the location of a user with a low cost compared to other location awareness system because the camera based local awareness apparatus according to the present invention uses an inexpensive position identification tag which may be created by printing a predetermined shape on a paper and a camera that is commonly provided with a portable terminal as a standard option.

A camera based location awareness apparatus according to an embodiment of the present invention can accurately identify a position identification tag because location awareness is performed based on the vision image of a camera, which is similar to a human's vision. Also, the camera based location awareness apparatus and method can recognize a location based on a human's vision and intelligence. Therefore, the camera based location awareness apparatus according to the present invention can correct a location awareness error.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A location awareness apparatus for recognizing a position using a camera, comprising:
  an image capturing means for photographing a position identification tag using a camera;
  a distance measuring means for measuring a distance to a position identification tag;
  an incident angle measuring means for measuring a photographing angle at a visual point of photographing a position identification tag by the image capturing means;
  an image analyzing means for reading the photographed image from the image capturing means, and requesting location information corresponding to the read information to a position recognition server; and
  a location recognizing means for estimating a current location using the distance to the position identification tag, which is measured by the distance measuring means, the photographing angle of the position identification tag, which is measured by the incident angle measuring means, and the location information corresponding to the read information by the image analyzing means.

2. A location awareness apparatus for recognizing a position, comprising:
  a user portable terminal; and
  a local awareness server,
  where the user portable terminal includes:
  an image capturing means for photographing a position identification tag using a camera;
  a distance measuring means for measuring a distance to a position identification tag;
  an incident angle measuring means for measuring a photographing angle at a visual point of photographing a position identification tag by the photographing means; and
  a transmitting means for transferring the photographed image by the photographing means, the measured distance information by the distance measuring means, and the incident angle information measured by the incident angle measuring means, and
  where the position recognition server includes:
  an image analyzing means for reading the photographed image transferred from the transmitting means and requesting location information corresponding to the read information to a database;
  a location awareness means for estimating a current location using the distance to the position identification tag, which is transmitted from the transmitting means, the photographing angle of the position identification tag, which is transmitted from the transmitting means, and the location information corresponding to the read information by the image analyzing means; and
  a transmitting means for transmitting the estimated current location information to the user portable terminal.

3. The location awareness apparatus of claim 1, wherein the distance measuring means measures a distance to the position identification tag photographed by the image capturing means using a camera focus distance.

4. The location awareness apparatus of claim 1, wherein the distance measuring means measures a distance to the position identification tag photographed by the image capturing means using an ultrasonic wave.

5. The location awareness apparatus of claim 1, wherein the distance measuring means measures a distance to the position identification tag photographed by the image capturing means using an infrared ray sensor.

6. The location awareness apparatus of claim 1, wherein the incident angle measuring means measures a photographing angle at a visual point of photographing a position identification tag by the image capturing means using an electric compass.

7. The location awareness apparatus of claim 1, wherein the location awareness means calculates a current location using triangulation.

8. A location awareness method using a camera, comprising the steps of:
- measuring a distance to a position identification tag photographed by a camera;
- measuring a photographing angle at a visual point of photographing the position identification tag;
- reading the photographed image and requesting location information corresponding the read information; and
- calculating a current location using information about the measured distance, the measured photographing angle, and the location information corresponding to the read information.

9. The location awareness method of claim 8, wherein in the step of measuring the distance, the distance to the photographed position identification tag is measured using a camera focus distance.

10. The location awareness method of claim 8, wherein in the step of measuring the distance, the distance to the photographed position identification tag is measured using an ultrasonic wave.

11. The location awareness method of claim 8, wherein in the step of measuring the distance, the distance to the photographed position identification tag is measured using an infrared ray sensor.

12. The location awareness method of claim 8, wherein in the step of measuring the photographing angle, the photographing angle at the visual point of photographing the position identification tag is measured using an electric compass.

13. The location awareness method of claim 8, wherein in the step of calculating the current location, the current location is calculated using triangulation.

* * * * *